Patented Dec. 20, 1938

2,140,508

UNITED STATES PATENT OFFICE 2,140,508

PRODUCTION OF ETHYL CHLORIDE

Leonard C. Chamberlain, Jr., James L. Amos, and Jack L. Williams, Midland, Mich., assignors to The Dow Chemical Company, Midland, Mich., a corporation of Michigan No Drawing. Application August 26, 1936, Serial No. 98,099

4 Claims. (Cl. 260—663)

The present invention relates to methods for the preparation of ethyl chloride by the direct addition of hydrogen chloride to ethylene.

According to one method for carrying out such reaction, a hydrohalogenation catalyst such as aluminum chloride is dissolved or suspended in an inert liquid medium, and a mixture of ethylene and hydrogen chloride in approximately equimolecular proportions is then intimately contacted therewith under substantially anhydrous conditions. Preferably the liquid medium is maintained at a temperature between about −10° C. and about 12° C., and at atmospheric pressure. Under such conditions the catalyst gradually loses its ability to promote the reaction, and fresh catalyst must be added at intervals to the liquid medium. It has been found that, according to such procedure, an average yield of only about 5 to 20 pounds of ethyl chloride can be obtained per pound of catalyst used up in the process.

It is a particular object of the present invention to provide an improvement in such procedure whereby the yield of ethyl chloride per pound of catalyst consumed is materially increased. We have now found that it is possible by suitably modified procedure to obtain yields of over 75 pounds of ethyl chloride per pound of aluminum chloride catalyst, and that the efficiency of the liquid catalyst is markedly increased and a higher rate of flow of ethylene gas per unit of said liquid medium can be maintained. The invention, then, consists in the method hereinafter fully described, and particularly pointed out in the claims.

In carrying out the addition reaction between a gas containing ethylene and hydrogen chloride under the conditions above set forth, we have determined that the yield of ethyl chloride per pound of hydrohalogenation catalyst is increased some 4 to 15 times if the following procedure is used whenever the efficiency of the catalyst medium decreases to the point at which it becomes desirable to add fresh catalyst. A portion of the inert liquid medium containing the catalyst is withdrawn from the reaction zone to a zone of higher temperature than that prevailing in said first zone, additional catalyst is incorporated with the withdrawn portion and that portion is returned to the reaction zone, preferably first being cooled to about the temperature of the latter. The temperature range to be used in the catalyst addition zone is above 12° C. but below the boiling point of the liquid carrier medium, and preferably between about 20° C. and about 50° C., and the medium is to be maintained at such temperatures for a sufficient period of time to dissolve or suspend the catalyst added. A portion of the bath may be treated in the manner just described when the efficiency of the catalyst to promote the combining reaction falls below about 90 per cent of the ethylene entering the system. Ethylene and hydrogen chloride may be passed into the withdrawn portion after fresh catalyst has been incorporated therewith to facilitate the dissolution of catalyst into the liquid medium.

The following example illustrates the practice of our invention in a continuous system:

A solution consisting of 179 pounds of tetrachloroethane and 4.5 pounds of aluminum chloride was continuously passed down through a packed tower provided with an indirect brine cooling system and means to return said solution to the top of the tower. This solution had been heated to a temperature of about 44° C. for a period of 50 minutes before it was introduced into the circulating system. An ethylene-containing gas, of the composition hereinafter given, was fed in at the bottom of the tower together with an equivalent volume of gaseous hydrogen chloride, the mixed gases rising against the down flow of catalytic solution. The ethylene-containing gas was obtained by the pyrolytic decomposition of a petroleum fraction followed by the chlorination thereof to remove unsaturates higher than ethylene, the analysis being:

| | Percent by weight |
|---|---|
| Ethylene | 43 |
| Hydrogen chloride | 6 |
| Methane and homologues | 5 |
| Hydrogen | 44 |
| Air | 2 |

The above gas was fed into the bottom of the tower at the rate of 6.3 pounds of ethylene, along with 9.0 pounds of hydrogen chloride, per hour, the temperature of the circulating catalyst solution being maintained at about 5° C. by the cooling system. The process was continued for a period of 23.5 hours under the conditions above given until only 85 per cent of the ethylene being passed into the system was being reacted, at which time 25 pounds of solution was withdrawn from the circulating body of liquid. 2.45 pounds of aluminum chloride was added to this withdrawn portion, which was then heated to and maintained at a temperature of 34° C. for one hour, then cooled to a temperature of about 5°

C. and returned to the main body of circulating medium. Over a period of 72 hours, during which time a total of 11.6 pounds of aluminum chloride was used, 920 pounds of ethyl chloride was produced, which amounts to a yield of approximately 79.0 pounds of ethyl chloride product per pound of aluminum chloride employed in the process.

A modified procedure from that just described may be employed; for instance, the reaction bath described in the foregoing example may be continuously withdrawn, as at the bottom of the reaction tower, from the reaction zone and passed through a warming up zone in which additional catalyst is intermittently or continuously incorporated therewith as required, the portion so treated being thereafter cooled to the normal reaction temperature and continuously returned to the reaction zone, preferably near the top of the tower system. In a further modification, mixed ethylene and hydrogen chloride gases may be discontinuously reacted, the flow of such gases in contact with the reaction medium being temporarily suspended during the withdrawal of portions of said medium and the accompanying catalyst addition and temperature manipulations.

Suitable chlorinated aliphatic hydrocarbons which may be employed in the preparation of the liquid catalytic medium are ethylene chloride, 1.1.2-trichloroethylene, tetrachloroethylene, acetylene tetrachloride, propylene chloride, etc. We have found that during operation according to the above example, the ethyl chloride product builds up to a concentration of approximately 20 per cent in the catalyst medium, after which the ethyl chloride formed vaporizes from the circulating medium and is carried along by the exit gases, said gases being passed into a condenser to recover the ethyl chloride therefrom. Among the hydrohalogenation catalysts that can be used in the above-described process are aluminum chloride and ferric chloride.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a continuous process for the production of ethyl chloride from ethylene and hydrogen chloride in the presence of a hydrohalogenation catalyst carried by a circulating inert liquid medium maintained at a temperature below the boiling point of ethyl chloride, the steps which consist in, withdrawing a portion of said medium from the reaction zone to a zone maintained at a temperature above the boiling point of ethyl chloride but below the boiling point of said inert liquid medium, incorporating fresh catalyst with the withdrawn portion of said medium while it is in said zone of higher temperature, and thereafter returning said portion to the reaction zone.

2. In a continuous process for the production of ethyl chloride from ethylene and hydrogen chloride in the presence of a hydrohalogenation catalyst carried by a circulating inert liquid medium comprising a chlorinated aliphatic hydrocarbon maintained at a temperature below the boiling point of ethyl chloride, the steps which consist in, withdrawing a portion of said medium from the reaction zone to a zone maintained at a temperature above the boiling point of ethyl chloride but below the boiling point of said inert liquid medium, incorporating fresh catalyst with the withdrawn portion of said medium while it is in said zone of higher temperature, and thereafter returning said portion to the reaction zone.

3. In a continuous process for the production of ethyl chloride from ethylene and hydrogen chloride in the presence of a hydrohalogenation catalyst carried by a circulating liquid chlorinated aliphatic hydrocarbon maintained at a temperature below the boiling point of ethyl chloride, the steps which consist in, withdrawing a portion of said catalytic liquid from the reaction zone to a zone maintained at a temperature between 20° and 50° C., incorporating fresh catalyst with said withdrawn portion while it is in said zone of higher temperature, and thereafter returning said portion to the reaction zone.

4. In a continuous process for the production of ethyl chloride, the steps which consist in, reacting ethylene with hydrogen chloride in the presence of a hydrohalogenation catalyst carried by circulating inert liquid medium maintained at a temperature below the boiling point of said ethyl chloride, periodically withdrawing a portion of said medium from the reaction zone to a zone maintained at a temperature above the boiling point of ethyl chloride but below the boiling point of said liquid medium when activity of said hydrohalogenation catalyst has substantially diminished, incorporating fresh catalyst with said withdrawn portion while it is in said zone of higher temperature, and thereafter returning said withdrawn portion to the reaction zone.

LEONARD C. CHAMBERLAIN, Jr.
JAMES L. AMOS.
JACK L. WILLIAMS.